(12) United States Patent
Clugston

(10) Patent No.: US 6,250,697 B1
(45) Date of Patent: Jun. 26, 2001

(54) DEVICE FOR TRAPPING DEBRIS AGAINST A TOOLHEAD

(76) Inventor: Scot J. Clugston, 27953 Whitcomb, Livonia, MI (US) 48154

( * ) Notice: Subject to any disclaimer, the term of this patent is extended or adjusted under 35 U.S.C. 154(b) by 0 days.

(21) Appl. No.: 09/449,408

(22) Filed: Nov. 26, 1999

(51) Int. Cl.$^7$ .................................................. A01B 1/16
(52) U.S. Cl. ........................................ 294/50.9; 56/400.12
(58) Field of Search ..................... 294/50.6, 50.8, 294/50.9, 51, 59, 104; 56/400.12

(56) References Cited

U.S. PATENT DOCUMENTS

| | | | |
|---|---|---|---|
| 917,634 | * | 4/1909 | Melby .................... 294/50.9 |
| 1,222,711 | * | 4/1917 | Armstrong ............. 294/50.8 |
| 2,942,401 | * | 6/1960 | Napoli .................. 294/50.9 X |
| 3,164,945 | | 1/1965 | Spencer ................ 56/400.12 |
| 4,037,397 | * | 7/1977 | Fiorentino ........... 294/50.8 X |
| 4,185,448 | * | 1/1980 | Blanco ................. 294/50.9 X |
| 4,378,671 | | 4/1983 | Gascon ................. 294/50.9 X |
| 4,427,227 | * | 1/1984 | Haskell ................. 294/50.9 |
| 4,545,189 | | 10/1985 | Nelson ................. 294/50.9 X |
| 4,991,386 | * | 2/1991 | Dirksen ................ 294/50.8 X |
| 5,058,370 | | 10/1991 | Russell ................ 56/400.12 |
| 5,459,988 | | 10/1995 | Glaser ................. 56/400.12 X |
| 5,564,267 | | 10/1996 | Bricker et al. ....... 294/50.8 X |
| 5,901,540 | * | 5/1999 | Vella ................... 294/50.9 X |

* cited by examiner

Primary Examiner—Johnny D. Cherry
(74) Attorney, Agent, or Firm—Harness, Dickey & Pierce, P.L.C.

(57) ABSTRACT

A device for trapping debris against a tool head includes a base portion attachable to a tool shaft having an auxiliary head pivotally mounted thereto. The auxiliary head includes a pair of spaced arcuate arms each having a distal end. Disposed between the arms proximal the distal ends thereof is a concave scoop for scooping and receiving debris. The base portion includes a clip for removably receiving a handle stem on the auxiliary head to selectively lock the scoop at a position adjacent the tool head to trap debris therebetween.

23 Claims, 4 Drawing Sheets

DEVICE FOR TRAPPING DEBRIS AGAINST A TOOLHEAD

BACKGROUND OF THE INVENTION

The present invention relates to a device which can be quickly attached to a tool handle for assisting a user in trapping debris against the toolhead.

DESCRIPTION OF THE PRIOR ART

Various tools such as rakes, shovels and brooms are used to accumulate and remove debris from floors, lawns and similar surfaces. Typically, the debris is maneuvered into one or more piles which must be transferred to a waste container. To remove leaves, a user must stoop and grasp the tool with one hand and press the debris against the tool head with the other. To remove dirt or dust, the user must bend over and rake the debris into a dust pan or similar receptacle for disposal. In either event, such a task is laborious, strenuous and time consuming. The present invention provides a device which may be attached to any one of a number of tool handles that can trap debris against the tool head so that the debris may be quickly and easily transferred to a disposal receptacle.

A myriad of devices for trapping debris against rakes and similar tools exists in the prior art. For example, U.S. Pat. No. 5,564,267 issued to Bricker et al relates to a raking and pickup tool including a pair of shafts pivotally joined at intermediate portions thereof. One shaft has a scooping head, such as a shovel or rake head, while the other shaft has a rake head having tines extending away from the scooping head.

U.S. Pat. No. 5,459,988 issued to Glaser relates to a quick connect rake system comprising two rakes or similar yard tools pivotally attached by a quick connect tube system.

U.S. Pat. No. 5,058,370 issued to Russell relates to a pickup head hingedly attached to the rear side of a lawn rake. The device includes a clamp for securing the pickup head in an upright storage position so as not to interfere with raking. When debris removal is desired, the arm is pulled forward releasing it from the clamp. The head is then pushed adjacent the main rake head thereby compressing debris therebetween.

U.S. Pat. No. 4,545,189 issued to Nelson relates to a rake having a grasping head pivotally attached to a link fastened to the rake head. The pivotable link separates the upper portions of the two heads such that the grasping capacity is greater than that of conventional rakes with grasping devices.

U.S. Pat. No. 4,378,671 issued to Gascon relates to a pickup rake having a main rake head and an auxiliary rake head movably mounted with respect to the main rake head.

U.S. Pat. No. 3,164,945 issued to Spencer relates to a lawn rake including a pair of rake heads.

Although various tools for trapping debris against a rake head exist in the prior art, the above described devices have several disadvantages. In order to maintain debris between the tool head and auxiliary head, pressure must be continuously applied to the auxiliary head. If the requisite amount of pressure is not applied, the debris will be released. Furthermore, each of the auxiliary heads described above either relate to a rake head or a larger shovel type head, either of which have limited utility. The present invention provides a device attachable to a tool handle which includes a clip for locking a scoop in a position immediately adjacent the tool head to trap debris therebetween. Furthermore, the tool head is uniquely configured to be interchangeably used with rakes, shovels, brooms and other tools. This interchangeability can occur without modification to the tool itself (i.e. no special connection features are required on the shaft). Additionally, the device of the present invention provides an increased range of pivotal motion for the device, relative to the tool. Finally, the scoop functions as a dust pan for receiving and transferring debris.

SUMMARY OF THE INVENTION

The present invention relates to a device for trapping debris against a toolhead. The device comprises a base portion having an arcuate indention for receiving a portion of a tool handle. A clamp is mounted to an opposing portion of the handle and is secured to the base portion. Hingedly attached to the base portion is an elongated auxiliary head. The auxiliary head includes a pair of arcuate arms having a debris scoop disposed therebetween. The scoop is positioned proximal the distal ends of the arms so as to be insertable beneath a pile of debris. At an opposing end of the auxiliary head is a stem having a handle attached thereto. A locking clip is disposed on the base portion for removably receiving the handle stem. When the handle is moved towards the tool handle and the stem is inserted into the locking clip, the scoop is locked in a position immediately adjacent and facing the tool head, automatically trapping debris thereagainst. It is therefore an object of the present invention to provide a device that can effectively trap debris against a tool head.

It is another object of the present invention to provide a device for trapping debris against a tool head that can be interchageably used with various tools which are standard, requiring no modification for attaching the device.

It is yet another object of the present invention to provide a device for trapping debris against a tool head which may be locked in a position adjacent the tool head. Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
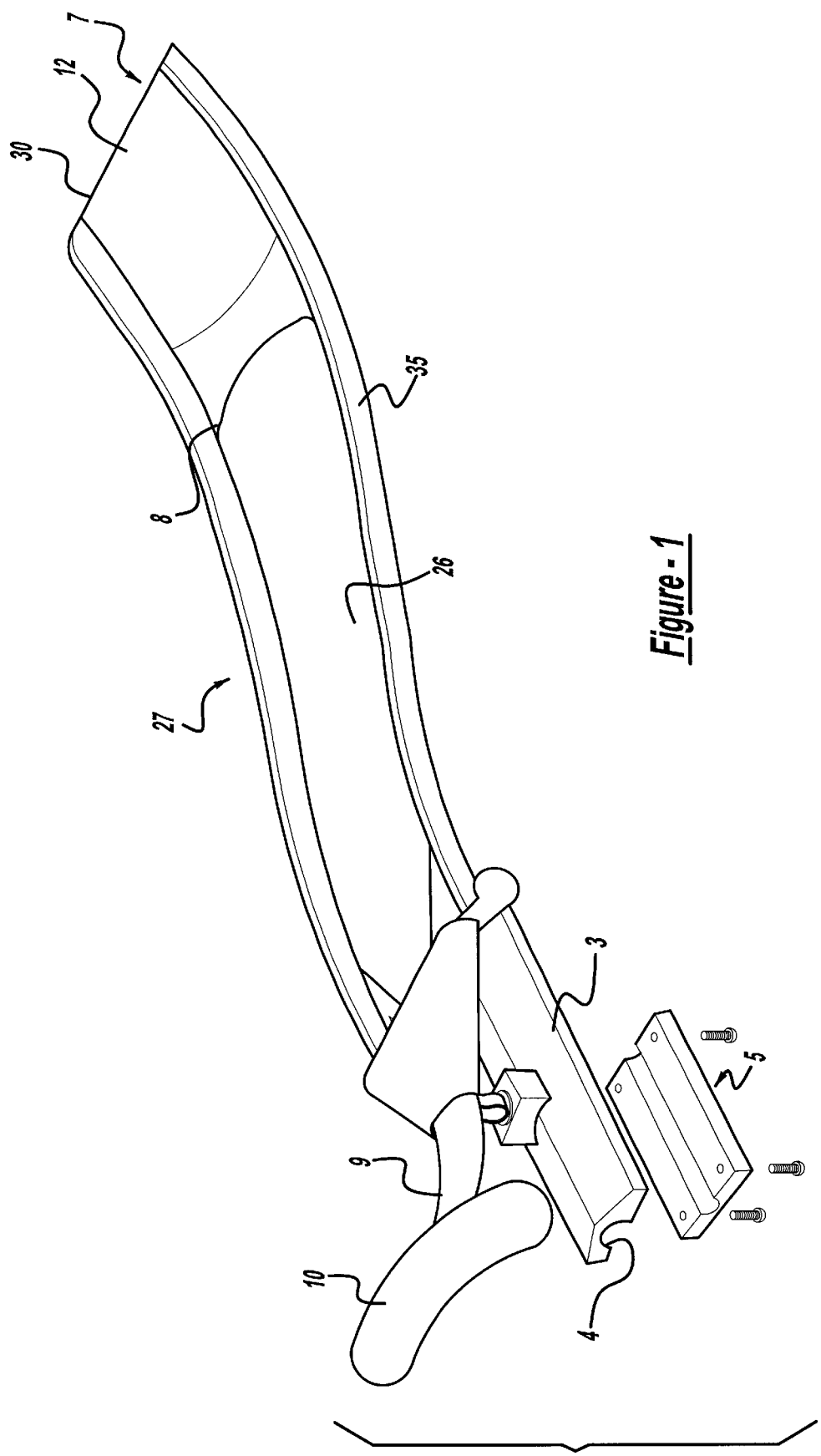
FIG. 1 is a perspective view of a debris trapping device according to the principles of the present invention.
Figure 2:
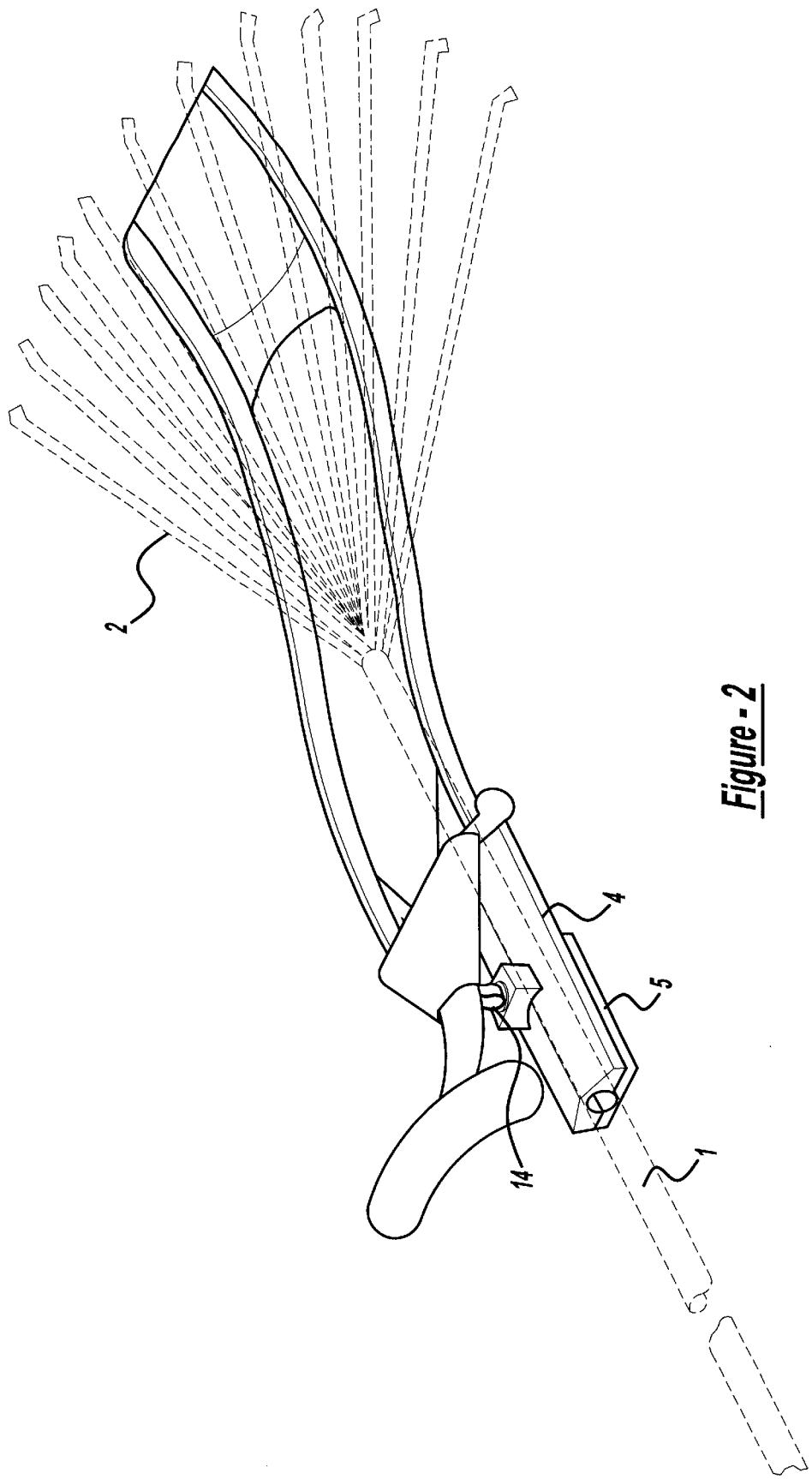
FIG. 2 is a perspective view of the device attached to a tool.
Figure 3:
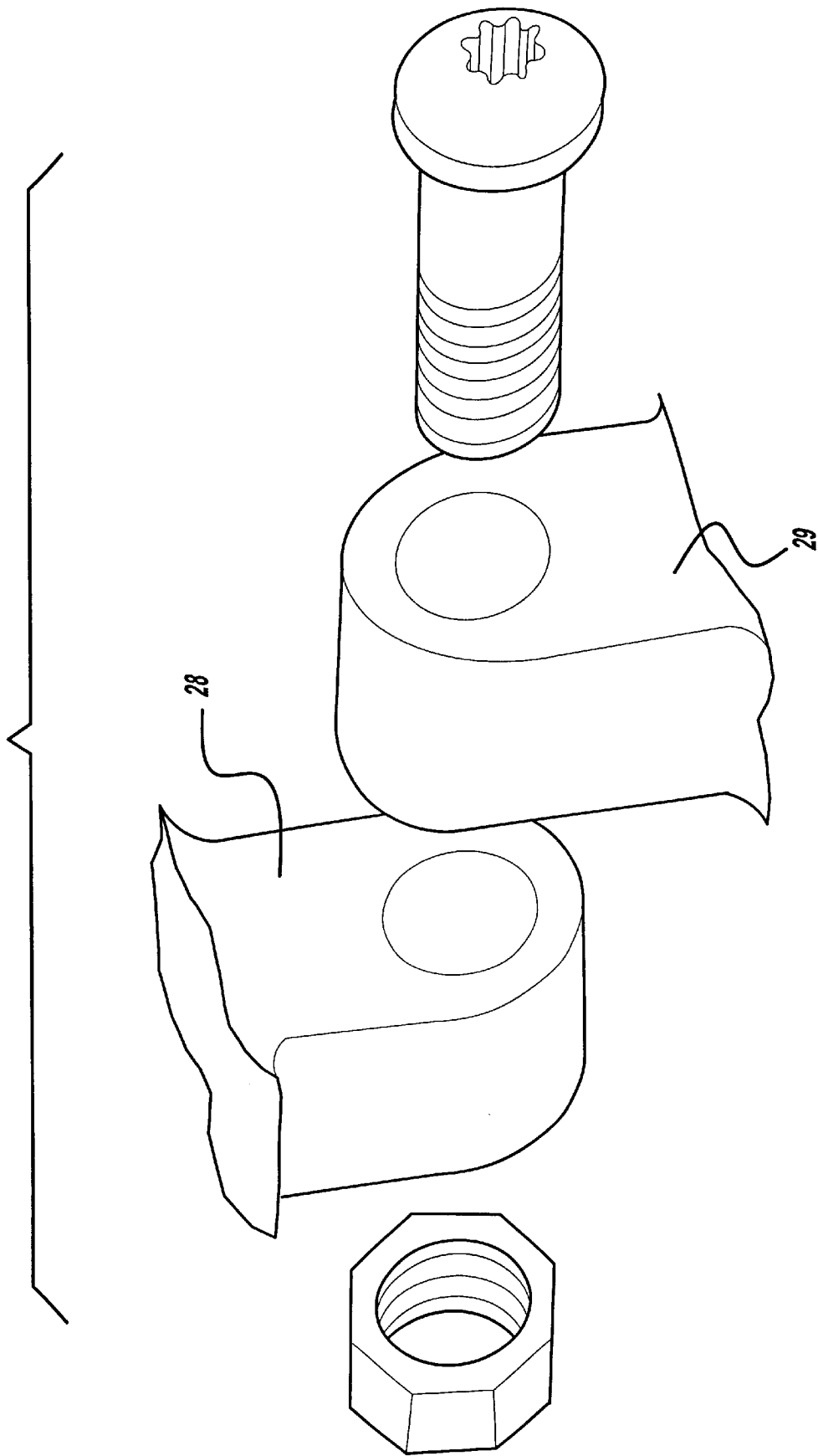
FIG. 3 is a detailed view of a hinge component that connects a body to a base portion.

Referring now to FIGS. 1 through 3, the present invention relates to a device for trapping debris against a tool head. A tool typically includes an elongated tubular shaft 1 having a head 2 at an end thereof such as a rake head, a broom head or a shovel.

The present invention includes a base portion 3 having an arcuate groove 4 thereon for receiving a portion of the tool shaft 1. A clamp member 5 likewise having an arcuate groove thereon is placed about the opposing portion of the shaft and is fastened to the base portion 3 to secure the device to the shaft 1. Attached to the base portion 3 is a body 27 which is arcuate in shape and pivotable relative to the base portion 3. The body 27 includes a pair of spaced collars 28 each of which are rotatably joined to similar collars 29 upwardly extending from the base portion 3. In a first preferred embodiment, the body 27 includes a slot 26, such that a pair of curved arms 35 are formed with a debris scoop 7 disposed therebetween. It should be noted that the tubular shaft 1 is received through the slot 26 such that the arcuate shape of the body 27 curves the scoop 7 upward, towards the tool head 2. The scoop 7 is positioned adjacent the terminal ends of the arms 35, at a first end of the body 27. The scoop 7 preferably has a concave lower surface 12 and a thin, front edge 30 to facilitate insertion beneath a pile of debris (not shown). The configuration also allows the scoop 7 to function as a dust pan for transferring debris to a disposal container. The scoop 7, therefore, functions as both a debris trap and collection pan. Additionally, the size (i.e. width and/or length) of the scoop 7 can vary to better match to a particular tool head size. A brace member 8 may be included and disposed between the arms 35 to provide structural integrity to the body 27.

Figure 4:
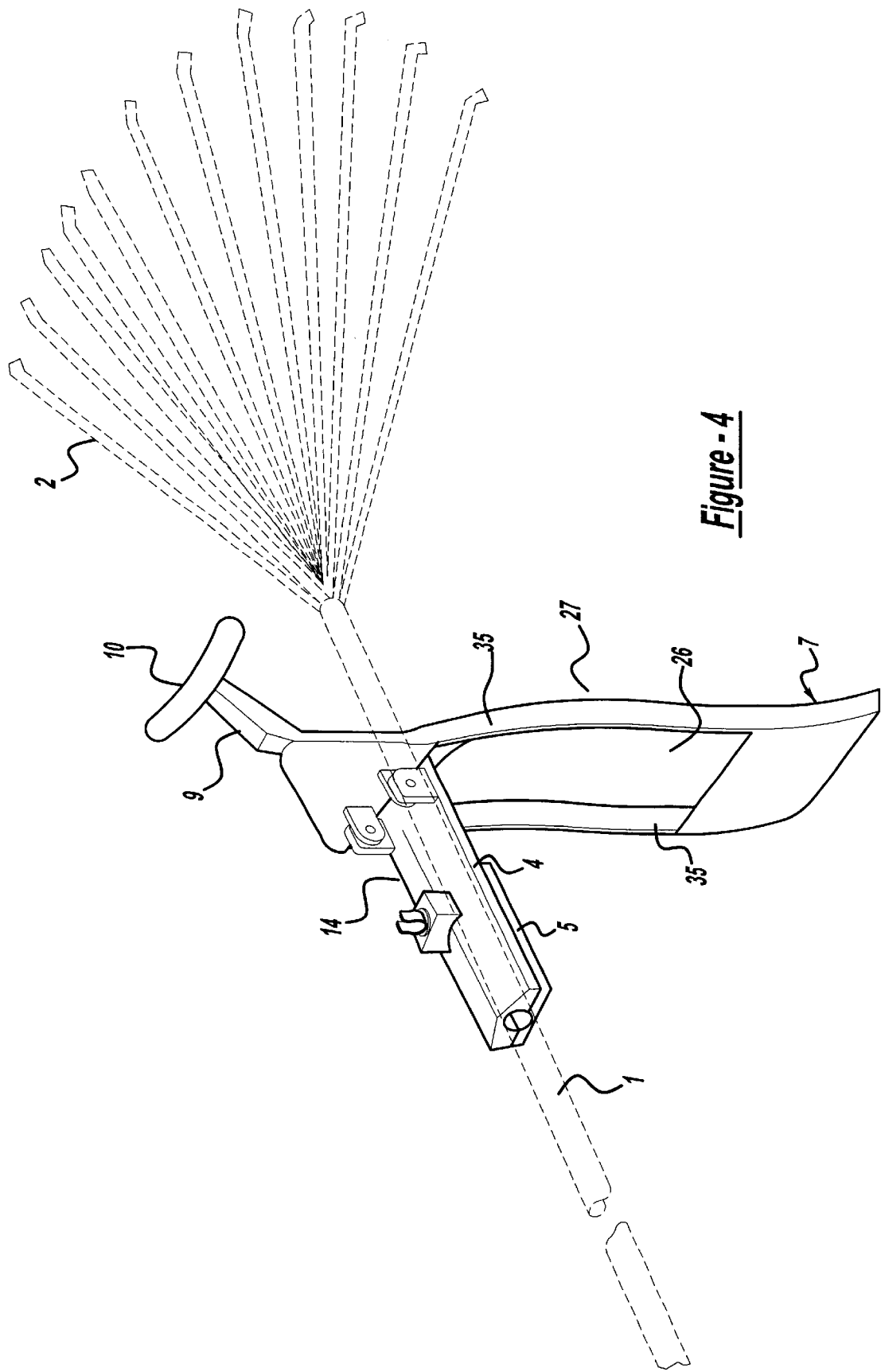
FIG. 4 is a perspective view of the device in an open position.

At an end of the body 27, opposite the scoop 7 is an elongated stem 9 having a handle 10 attached thereto which is grasped by a user when pivoting the scoop 7 towards and away from the tool head 2. As shown in FIGS. 1 and 2, the device of the present invention enables over 90° range of motion of the body 27, relative to the tubular shaft 1. This enables a broader range in the amount of debris an operator may trap against the head 2. This is best seen in FIG. 4. The handle 10 can be covered with a foam layer for enhanced comfort. Mounted on an upper surface of the base portion 3 is a pliable yoke 14 including a pair of spaced, flexible but resilient flanges which tightly receive the stem 9 to lock the scoop in a position immediately adjacent the tool head 2. Therefore, when the debris is pinned against the tool head 2, the body 27 can be locked in place thereby eliminating the need to stoop and trap the debris with one's hands.

The above described components are preferably constructed with plastic, aluminum or a similar equivalent. However, as will be readily apparent to those skilled in the art, the size, shape and materials of construction may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A debris trapping device for use in conjunction with a tool having a shaft, said device comprising:
    a base selectively attachable to said shaft;
    an arcuate body pivotally attached to said base, said arcuate body having a slot therein for receiving said shaft;
    a head disposed at a first end of said body for trapping debris against said tool; and
    a locking means fixedly attached to said base for selectively locking said body from pivoting.

2. The debris trapping device of claim 1 wherein said first end of said arcuate body is located on a first side of said tool and a second end of said body is on an opposing side of said tool.

3. The debris trapping device according to claim 1 further comprising a handle attached to a second end of said body, said handle extending angularly away from said shaft.

4. The debris trapping device according to claim 1 wherein said locking means includes a pliable yoke secured to said base for selectively holding a second end of said body.

5. The debris trapping device according to claim 1 wherein said head is generally scoop shaped.

6. The debris trapping device of claim 1, wherein said base further comprises:
    a first base member pivotally attached to said arcuate body, said first base member having an axial groove therein;
    a second base member attachable to said first base member, said second base member having an axial groove therein; and
    wherein said axial grooves of each of said first and second base members generally conform to the shape of said shaft.

7. A debris trapping device for use in conjunction with a tool having a shaft, said device comprising:
    a base selectively attachable to said shaft, said base including a first portion having an axial groove formed therein and a second portion having an axial groove formed therein, said second portion engageable with said first portion for securing said shaft therebetween;
    a body pivotally attached to said base;
    a head disposed at a first end of said body for trapping debris against said tool; and
    a locking means fixedly attached to said base for selectively locking said body from pivoting.

8. The debris trapping device according to claim 7 wherein said axial grooves of each of said first and second portions are shaped to conform to the shape of said shaft.

9. The debris trapping device according to claim 7 further comprising a handle attached to a second end of said body, said handle extending angularly away from said shaft such that an operator may pivot said body relative to said shaft.

10. The debris trapping device according to claim 7 wherein said locking means includes a pliable yoke secured to said base for selectively holding a second end of said body.

11. The debris trapping device according to claim 7 wherein said head is scoop shaped.

12. The debris trapping device according to claim 7 wherein said body is arcuate and includes an aperture such that said first end is located on a first side of said tool, a second end of said body is located on a second side of said tool and said shaft is received therethrough.

13. A debris trapping device for use in conjunction with a tool having a shaft, said device comprising:
    a base for selectively mounting said shaft;
    a body having a generally scoop shaped head disposed at a first end for trapping debris against said tool and a second end pivotally attached to said base; and
    a locking means fixedly attached to said base for selectively locking said body from pivoting.

14. The debris trapping device of claim 13 wherein said scoop shaped head includes an arcuate face having a generally sharp edge for aiding in insertion of said head below said debris.

15. The debris trapping device according to claim 13 further comprising a handle attached to said second end of said body, said handle extending angularly away from said shaft such that an operator may pivot said body relative to said shaft.

16. The debris trapping device according to claim 13, wherein said locking means includes a pliable yoke secured to said base for selectively holding said second end of said body.

17. The debris trapping device according to claim 13, wherein said body is arcuate and includes an aperture such that said first end is located on a first side of said tool, a second end of said body is located on a second side of said tool and said shaft is received therethrough.

18. The debris trapping device according to claim 13, wherein said base further comprises:

a first base member pivotally attached to said body, said first base member having an axial groove therein;

a second base member attachable to said first base member, said second base member having an axial groove therein; and wherein said axial grooves of each of said first and second base members generally conform to the shape of said shaft.

19. A debris trapping device for use in conjunction with a tool having a shaft, said device comprising:

a base for selectively mounting said shaft;

a body having a first end adapted to trap debris against said tool and a second end pivotally connected to said base;

a handle attached to said second end such that an operator may pivot said body relative to said shaft; and a locking means fixedly attached to said base for selectively locking said body from pivoting.

20. The debris trapping device of claim 19 wherein said handle extends angularly away from said shaft.

21. The debris trapping device according to claim 19 wherein said locking means includes a pliable yoke secured to said base for selectively holding said second end of said body.

22. The debris trapping device according to claim 19, wherein said body is arcuate and includes an aperture such that said first end is located on a first side of said tool, a second end of said body is located on a second side of said tool and said shaft is received therethrough.

23. The debris trapping device according to claim 19, wherein said base further comprises:

a first base member pivotally attached to said body, said first base member having an axial groove therein;

a second base member attachable to said first base member, said second base member having an axial groove therein; and wherein said axial grooves of each of said first and second base members generally conform to the shape of said shaft.

* * * * *